US010836023B2

(12) United States Patent
Diogene et al.

(10) Patent No.: US 10,836,023 B2
(45) Date of Patent: Nov. 17, 2020

(54) METHOD OF USING A MOUNTING TOOL TO INSTALL AN H-SEAL IN A BEARING

(71) Applicant: Aktiebolaget SKF, Gothenburg (SE)

(72) Inventors: Jean-Marc Diogene, Saint-Germain de Modéon (FR); Damien Bredoire, Auxerre (FR); Michel Nicolas, Annay la Côte (FR)

(73) Assignee: Aktiebolaget SKF, Gothenburg (SE)

( * ) Notice: Subject to any disclaimer, the term of this patent is extended or adjusted under 35 U.S.C. 154(b) by 166 days.

(21) Appl. No.: 16/041,882

(22) Filed: Jul. 23, 2018

(65) Prior Publication Data

US 2019/0030697 A1   Jan. 31, 2019

Related U.S. Application Data

(60) Provisional application No. 62/539,339, filed on Jul. 31, 2017.

(51) Int. Cl.
| | |
|---|---|
| *B23P 19/00* | (2006.01) |
| *B25B 27/00* | (2006.01) |
| *F16C 33/78* | (2006.01) |
| *F16C 43/04* | (2006.01) |
| *F16C 33/76* | (2006.01) |
| *F16J 15/3236* | (2016.01) |
| *F16J 15/3268* | (2016.01) |
| *F16C 43/00* | (2006.01) |

(52) U.S. Cl.
CPC ...... *B25B 27/0092* (2013.01); *B25B 27/0028* (2013.01); *F16C 33/76* (2013.01); *F16C 33/7836* (2013.01); *F16C 43/045* (2013.01); *F16J 15/3236* (2013.01); *F16J 15/3268* (2013.01); *F16C 43/00* (2013.01); *F16C 2300/14* (2013.01)

(58) Field of Classification Search
CPC . B25B 27/0092; B25B 27/0028; B25B 27/06; B23P 11/00; B23P 111/027; B23P 17/00; B23P 19/04; Y10T 29/49696; Y10T 29/497; Y10T 29/49703; Y10T 29/49872
USPC .............. 29/235, 244, 255, 278, 252, 281.1
See application file for complete search history.

(56) References Cited

U.S. PATENT DOCUMENTS

| | | |
|---|---|---|
| 2,068,035 A | 1/1937 | Meyer |
| 2,761,199 A | 9/1956 | Allen |
| 3,307,249 A | 3/1967 | Hohoff |

(Continued)

FOREIGN PATENT DOCUMENTS

EP          3115157 A1     1/2017

*Primary Examiner* — Lee D Wilson
(74) *Attorney, Agent, or Firm* — Garcia-Zamor Intellectual Property Law; Ruy Garcia-Zamor; Bryan Peckjian

(57) ABSTRACT

A method of inserting an H-Seal in a bearing, the H-Seal having two ends, two upper lips, two lower lips and a vertical flange positioned between the bearing that secures the upper and lower lips together, the bearing having seal faces, inner and outer rings and a gap therebetween. The method provides including an insertion tool assembly, priming the H-Seal into the insertion tool, sliding the tool with the H-Seal loaded therein within a slot, placing the lower lips back on their respective face, allowing the lower lips to recover their initial shape. The tool moves the lower lips to a vertical position (T shape), inserts the seal between the rings and the lower lips recover their initial shape and places them naturally back on their respective faces.

18 Claims, 11 Drawing Sheets

(56) References Cited

U.S. PATENT DOCUMENTS

| | | | |
|---|---|---|---|
| 3,439,406 A | 4/1969 | Sven | |
| 3,550,242 A * | 12/1970 | Dallen | E04F 21/0038 |
| | | | 29/235 |
| 4,169,305 A | 10/1979 | Kruszona | |
| 4,199,852 A | 4/1980 | Ayers | |
| 5,045,146 A | 9/1991 | Rundo | |
| 9,404,581 B1 * | 8/2016 | Robinson | F16J 15/104 |
| 2002/0163137 A1* | 11/2002 | Esumi | F16C 33/7843 |
| | | | 277/551 |
| 2011/0219600 A1 | 9/2011 | Silliman | |

* cited by examiner

METHOD OF USING A MOUNTING TOOL TO INSTALL AN H-SEAL IN A BEARING

CROSS-REFERENCE

This application claims the benefit of U.S. Provisional Application 62/539,339, filed on Jul. 31, 2017, the contents of which is herein incorporated by reference in its entirety.

FIELD OF THE INVENTION

A method of using a mounting tool for inserting a seal in a bearing. In particular, a method of using a mounting tool for inserting an H-Seal in a bearing, the tool having evolutive guides.

SUMMARY OF THE INVENTION

In accordance with one or more embodiments, a method of inserting an H-Seal in a bearing is provided. In the present invention, the H-Seal has two ends, two upper lips, two lower lips and a vertical flange positioned between the bearing that secures the upper and lower lips together. The bearing has seal faces, inner and outer rings and a gap therebetween. The steps of the method include providing an insertion tool assembly having a first interconnecting portion configured to engage a second interconnecting portion, priming the H-Seal into the insertion tool, sliding the tool with the H-Seal loaded therein within a slot, placing the lower lips back on their respective face, allowing the lower lips to recover their initial shape. Moving the lower lips into a vertical position (T shape), inserting the seal between the rings, the lower lips recovering their initial shape, and placing them naturally back on their respective faces.

In a second aspect of the invention, first and second evolutive guides are configured to pass the H-Seal between the stages of being in a free state with the lower lips opened outward, to being pre-inserted into the bearing, to being inserted into the bearing, to coming down into the bearing, to the lower lips opening downward in a vertical position (T-Shape) between the inner and outer bearing rings, and finally, the two lower lips being able to recover into their initial shape opened outward, In a third aspect of the invention, before the step of priming, the insertion tool and H-seal are inverted.

In a further aspect of the invention, before the step of sliding, the insertion tool and H-seal are inverted back to their normal position prior to instillation into the bearing.

In a further aspect of the invention, the ends of the H-Seal being are bonded together after the H-Seal is installed.

In a further aspect of the invention, the first interconnecting portion is configured to receive a vertical part assembly through an opening in the first interconnecting portion that compliments the shape top and bottom portions of the vertical part assembly.

In a further aspect of the invention, during the step of sliding a vertical downward force is applied to the vertical part assembly.

In a further aspect of the invention during the step of sliding, a horizontal force is applied to the insertion tool in order set the tool in motion to install the H-Seal.

In a final aspect of the invention during the step of sliding, an optimal position of the roller with respect to horizontal is tangent to the top of the H-Seal.

BRIEF DESCRIPTION OF THE DRAWINGS

The invention will now be explained in correspondence with the annexed figures, as illustrative examples, without restricting the object of the invention. In the annexed figures.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

For purposes of description herein, the terms "inward," "outward," "upper," "lower," "left," "rear," "right," "front,"

Figure 1:
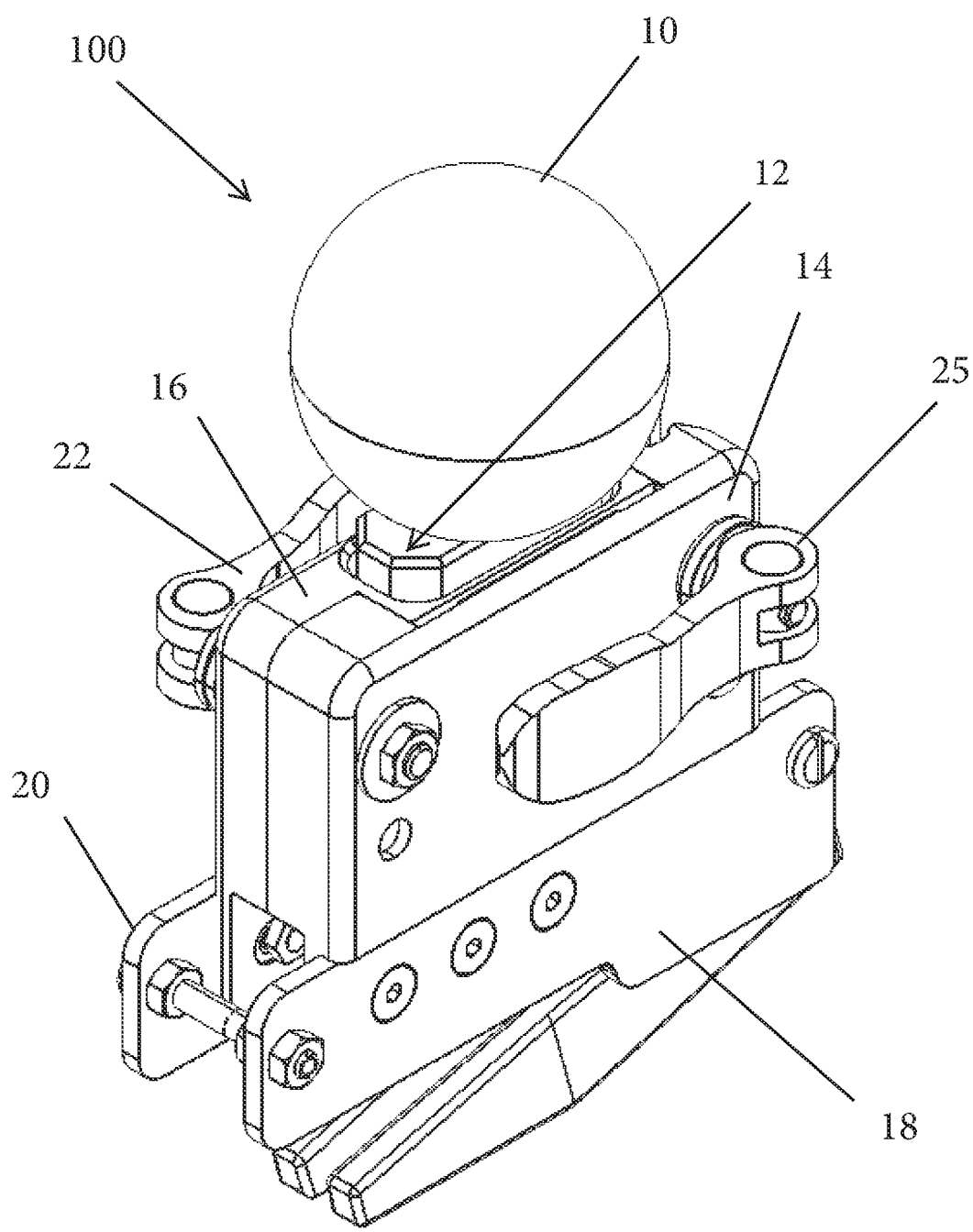
FIG. 1 shows an elevated perspective view of the insertion tool taken from the right side according to the present invention.

"vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Detailed Description of the Mounting Tool

Figure 2:
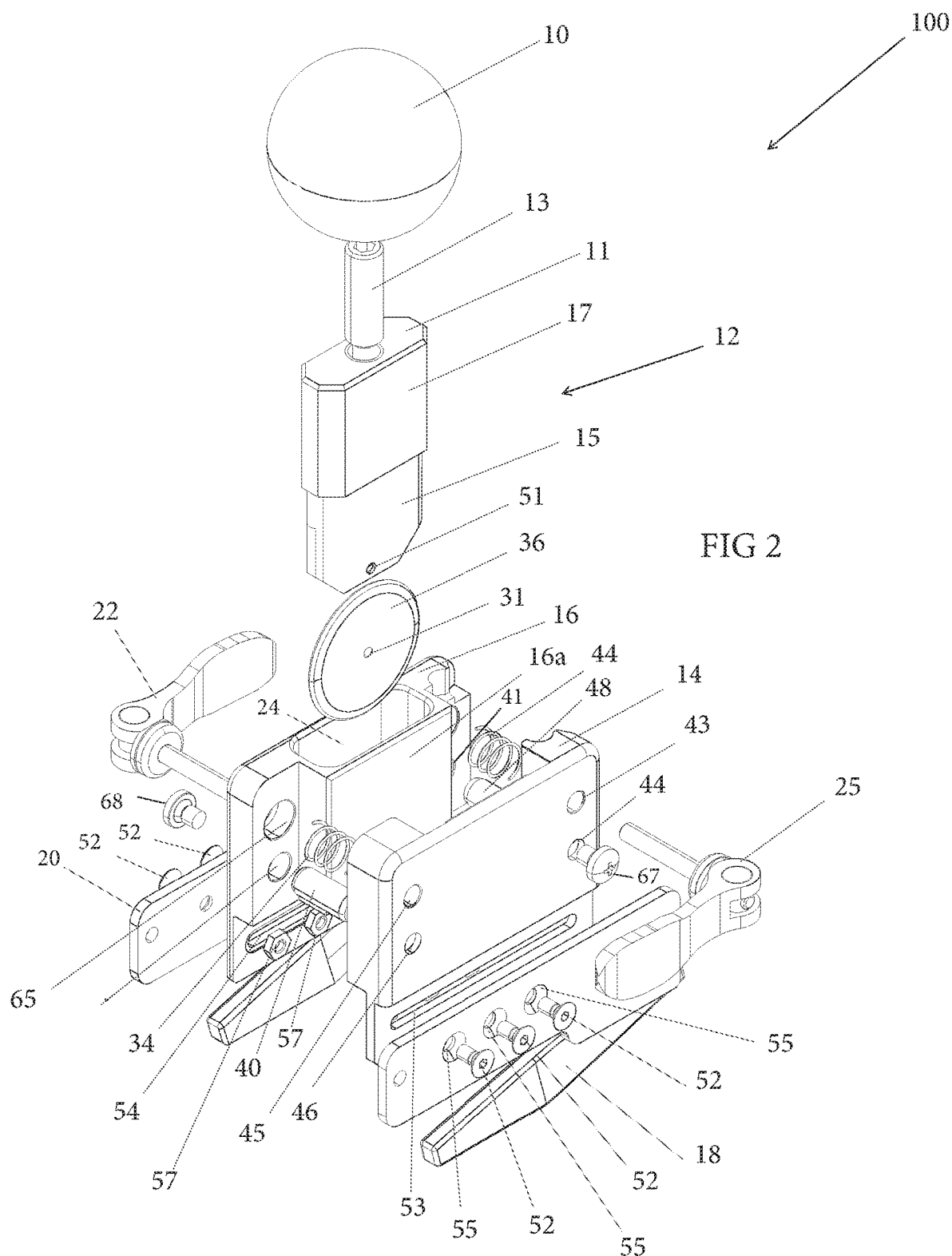
FIG. 2 shows an exploded perspective view of the insertion tool taken from the right side according to the present invention.
Figure 3:
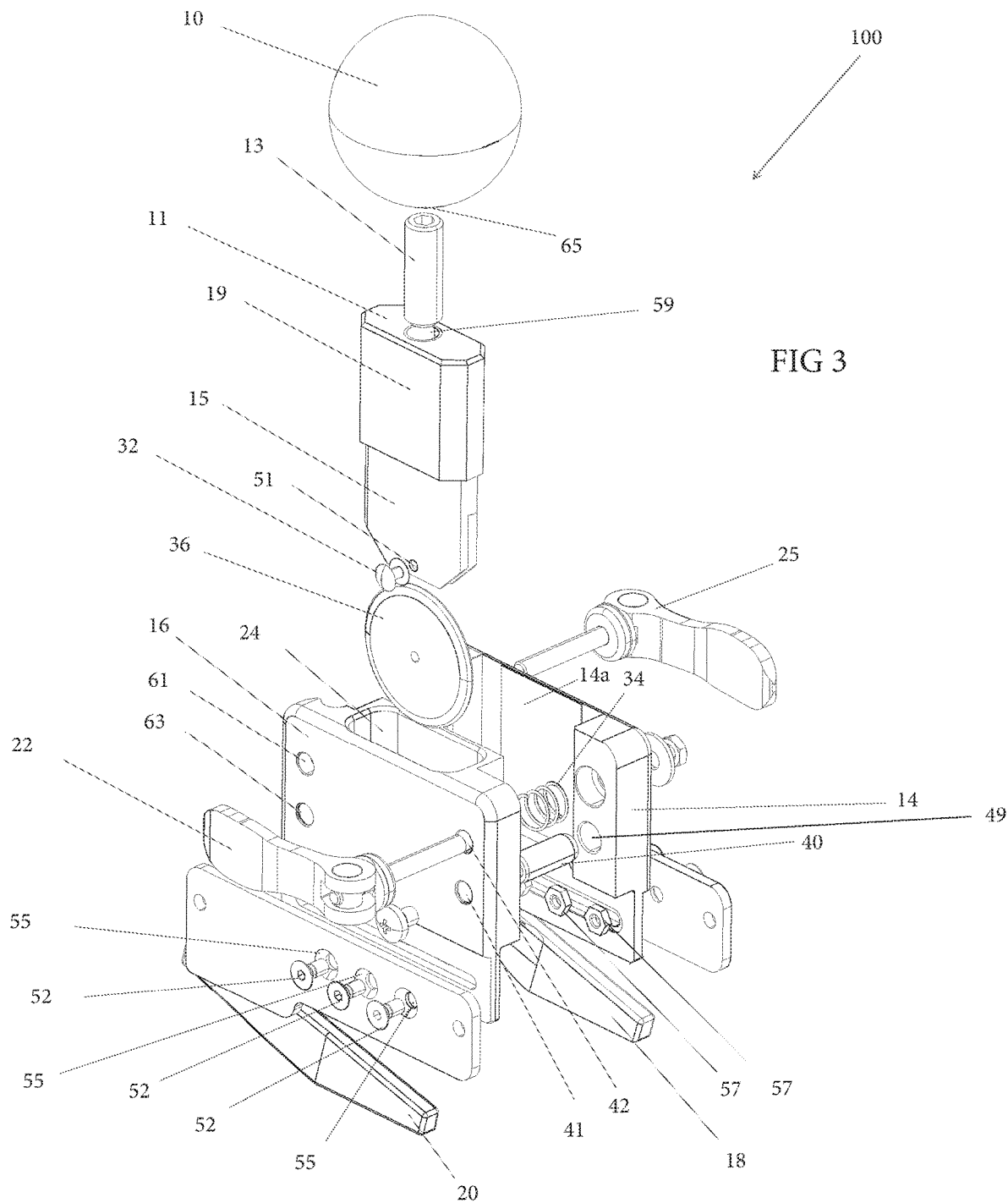
FIG. 3 shows an exploded perspective view of the insertion tool taken from the left side according to the present invention.

A tool assembly 100 for inserting an H-Seal HS in a bearing is first illustrated in FIGS. 1, 2 and 3. The H-Seal is typically made from a single piece of material, but could be constructed in multiple pieces. However, the single piece construction only requires a single solvent weld at the respective ends, which is easier to construct.

The tool assembly 100 includes a vertical part assembly 12, a left interconnecting assembly 16 and a right interconnecting assembly 14. The vertical part assembly 12 provides a top portion 11, a bottom portion 15, and a freely rolling disc or roller 36. The top portion 11 further includes right and left side portions 17, 19.

The left interconnecting portion 14 is configured to engage and mate with the right interconnecting portion 16. The right interconnecting portion 16 is configured to receive the vertical part assembly 12 down through a slot 24 in the second interconnecting portion 16. The slot 24 could be any shape for purposes of the invention. Here in the present embodiment, the slot 24 is shown as being mostly rectangular in shape.

The slot 24 is configured to compliment the shape of the top portion 11 of the vertical part assembly 12. During assembly, a close sliding fit is obtained between the top portion 11 of the vertical part assembly 12 and the slot 24 of the second interconnecting portion 16 when the vertical part assembly 12 is inserted down through the slot 24. The close sliding fit provides enough clearance for the accurate location of the top portion 11 into the slot 12 such that that there is no noticeable play between the two. The close sliding fit enables the freely rolling disc 36 to maintain a downward pressure on the top of the H-Seal. See FIG. 7.

The right and left interconnecting portions 14, 16 of the body are further configured to provide complimentary mating female 14a and male 16a portions respectively. That is, when the right and left interconnecting portions 14, 16 of the body are assembled inward towards each other the complimentary mating female 14a and male 16a portions meet together to become unitized as shown in FIG. 1.

The tool assembly 100 provides a first cam locking lever 22 that has a threaded end, a first spring 34 that fits over the threaded end of the first cam locking lever 22, and a first locating pin 40. The tool assembly 100 further provides a second cam locking lever 25 that has a threaded end, a second spring 44 that fits over the threaded end of the second cam locking lever, and a second locating pin 48.

The first cam locking lever 22 is configured to fit through a clearance hole 42 in the left interconnecting portion 16. The threaded end of the lever 22 is configured to screw into a threaded hole 45 in the right interconnecting portion 14. It could also be held in place by a retaining nut. The first spring 34 is inserted over the threaded end of the first locking lever 22 and rests within a recess 48 that encompasses clearance hole 42.

The second cam locking lever 25 is configured to fit through a clearance hole 43 in the right interconnecting portion 14. The threaded end of the lever 25 is configured to screw into a threaded hole 61 in the left interconnecting portion 16. Here again, it could be held in place by a retaining nut. The second spring 44 is inserted over the threaded end of the second locking lever 25 and rests within a recess (not shown) that encompasses clearance hole 43. The present configuration is symmetrical with the configuration described above in connection with the left interconnecting portion 16.

The first locating pin 40 is press fit into the left or male interconnecting portion 16 and the second locating pin 48 is press fit to the right or female interconnecting portion 14. The female and male interconnecting portions 14, 16 are slidingly assembled together such that the first locating pin projects and is guided into clearance hole 49 disposed within the female interconnecting portion. Conversely, the second locating pin 48 projects and is guided into the clearance hole (not shown) disposed within the male interconnecting portion.

Further, the other end of pin 40 is fastened to the male interconnecting portion 14 by way of being screwed in place through clearance hole 46. Additionally, the other end of pin 48 is fastened to interconnecting portion 16 by way of being screwed in place through clearance hole.

A gripping element 10 is connected to the top portion 11 of the vertical part assembly body 12. The gripping portion provides a handle or grip for moving the tool within the gap as the H-Seal is installed. The tool may further include an adapter 13 that connects the gripping element 10 to the top portion 11 of the vertical part assembly 12 at a bottom end. In this embodiment, the adapter 13 is mounted to the top portion 11 through a hole 59 by way of being press fit. Similarly, the adapter 13 may be mounted by way of a press fit to the gripping element 10 through a hole 65 disposed in a bottom end of the gripping element 10.

The rolling disk provides an cylindrical hole 31 positioned about its center. The rolling disc is mounted to the bottom portion 15 of the vertical part assembly 12 and fixed through an annular hole 51 to the bottom end 15 of the vertical part assembly 12. The rolling disc 36 can be attached to the bottom end 15 of the vertical part assembly 12 in any way that allows the roller to roll freely but still be fixed to the tool. As such, the roller may be riveted or pinned 32 to the cylindrical hole 31 in the bottom end 15 of the vertical part assembly 12.

Figure 4:
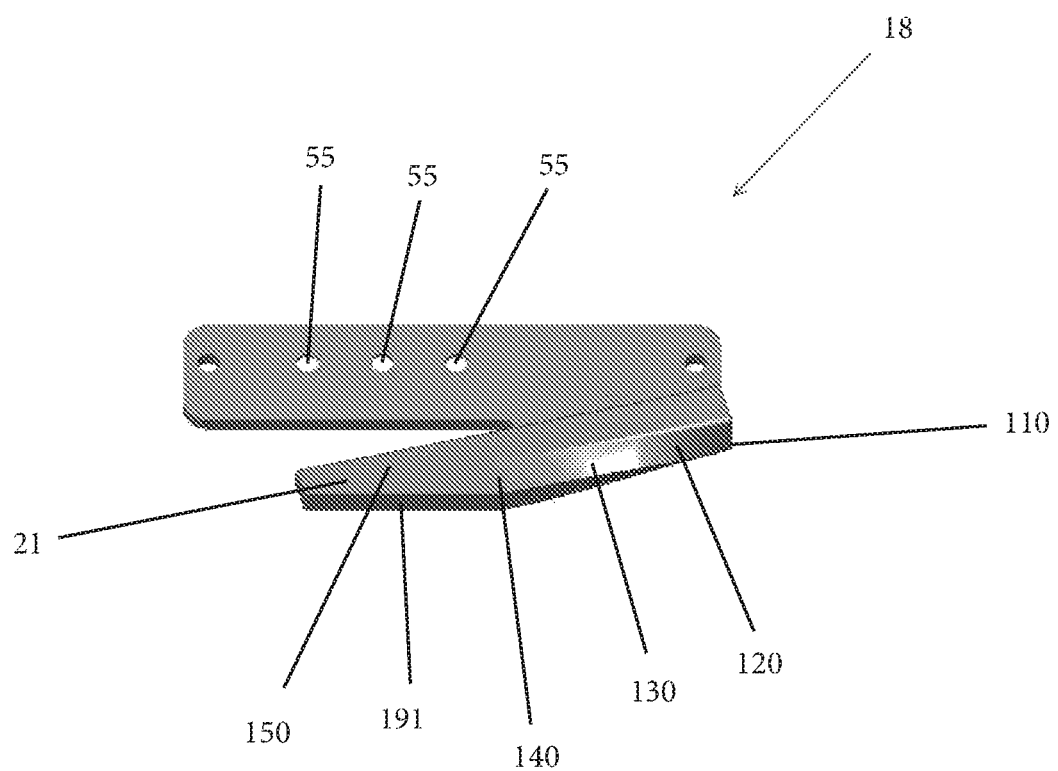
FIG. 4 shows an elevated perspective view of a right evolutive guide according to the insertion tool of the present invention
Figure 5:
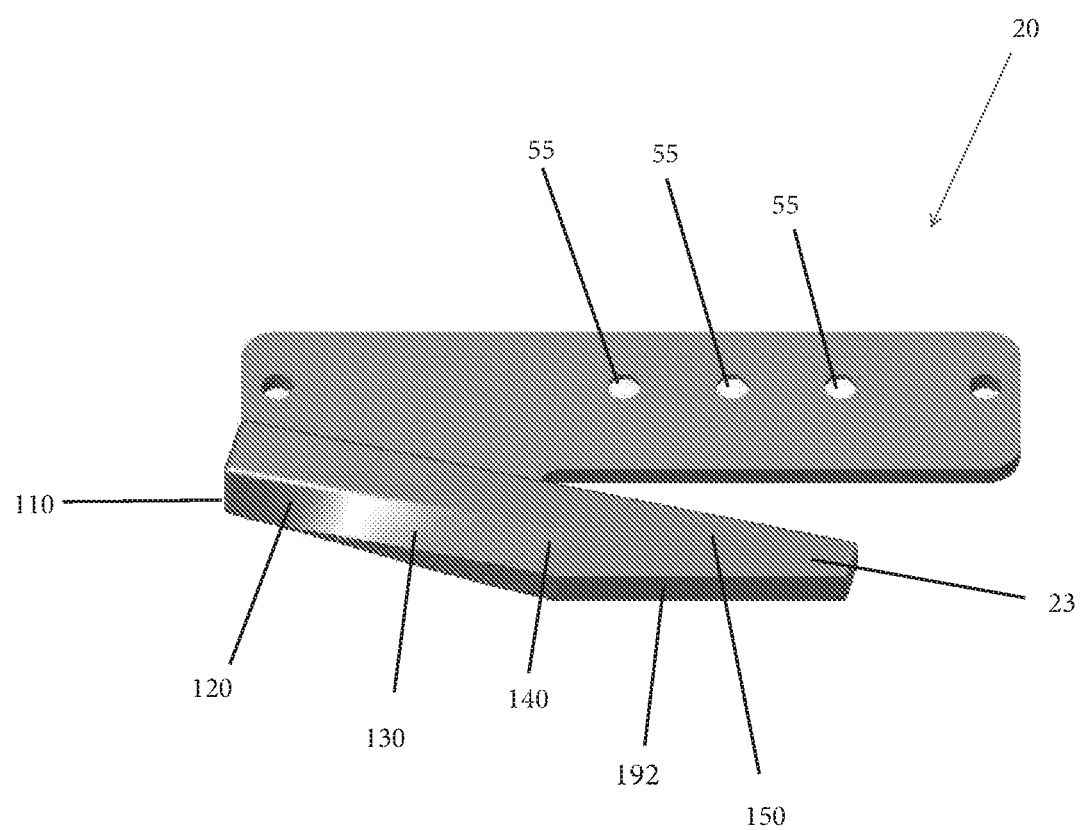
FIG. 5 shows an elevated perspective view of a left evolutive guide according to the insertion tool of the present invention.

First and second sliding pads 18, 20 are shown in FIGS. 4-5. The first and second sliding pads 18, 20 are connected to the right and left interconnecting portions 14, 16. The first and second sliding pads 18, 20 have first and second evolutive guides 21, 23 that vary in shape from top to bottom and from back to front. The first and second sliding pads 18, 20 may also provide first and second bearing contact bearing contact 191, 192 surfaces respectively.

Figure 6:
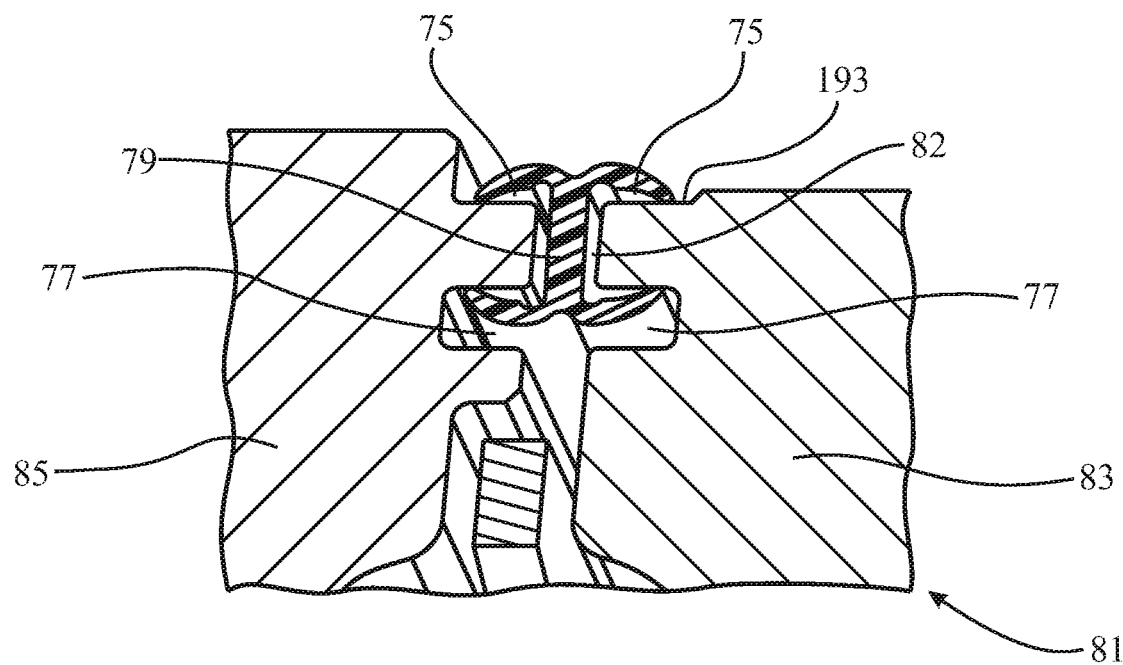
FIG. 6 shows an elevated cross-sectional view of the H-Seal installed into a bearing having used the insertion tool according to the present invention.

As shown in FIG. 6, the H-Seal has two upper lips 75, two lower lips 77 and a vertical flange 79 positioned therebetween that secures the upper and lower lips together. The bearing 81 has inner 83 and outer 85 rings and a gap 82 therebetween as illustrated as such.

The first and second evolutive guides 21, 23 are configured to pass the H-Seal between the stages of being in a free state with the lower lips 77 opened outward, to being pre-inserted into the bearing, to being inserted into the bearing, to coming down into the bearing, to the lower lips 77 opening downward in a vertical position (T-Shape)

between the inner and outer bearing rings, and finally, the two lower lips 77 being able to recover into their initial shape opened outward.

FIGS. 4-5 show the stages of evolution of the first and second evolutive guides:

Initially, as the H-Seal is fed through the tool and proceeds in a circular path around the bearing, the seal first makes contact with a leading edge 110 of the guide. At this point, the lower lips 77 of the H-Seal are being pre-inserted into the bearing.

As the seal continues to pass through the tool and on its circular path the seal encounters a 1st stage 120 of the evolutive guide. Here, the lower lips 77 of the seal are initially formed together in order to be inserted into the bearing.

As the seal continues to pass through the tool on its path the seal encounters a 2nd stage 130 of the evolutive guide. Here, the lower lips 77 of the seal are being further formed together to be inserted into the bearing.

As the seal continues to pass through the tool on its path the seal encounters a 3rd stage 140 of the evolutive guide. Here, the lower lips 77 of the seal are mostly folded or compressed together and are coming down into the bearing into the bearing.

As the seal continues to pass through the tool the seal encounters a flattening edge 150 of the evolutive guide. Here, the lower lips 77 of the seal are completely folded and are coming down and being inserted into the bearing. Accordingly, the seal is formed into the shape of a Y.

Finally, as the seal completely passes through the tool the two lower lips 77 are able to recover into their initial shape opened outward.

It may be necessary to adjust the width of the tool for H-Seals of different sizes. The present invention provides a simple way to do so. Upon assembly, the first and second cam levers are tightened such that the first and second springs 34, 44 compress and provide an outward force that opposes the tightening. The opposing spring force keeps the male and female connecting assemblies pushed apart from each other.

Therefore the insertion tool can be adjusted by turning the first and second cam levers in a clockwise or counterclockwise direction to either make the tool wider or thinner in order to match the horizontal width of the chosen H-seal to be inserted and the internal spacing of the inner and outer rings of the bearing. As such, the opposing force created by the springs also prevents sloppiness when adjusting the interconnecting assemblies.

Figure 7:
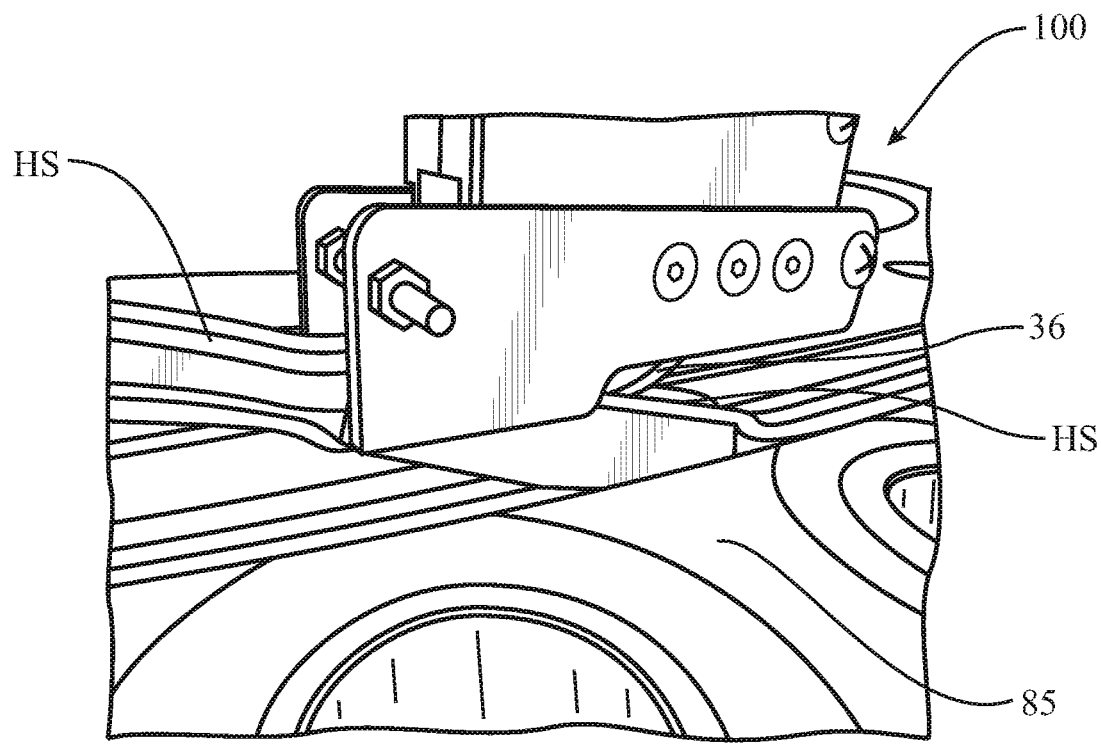
FIG. 7 shows a perspective view of the insertion tool inserting the H-seal into the bearing according to the present invention.

Finally, upon insertion of the H-Seal, an optimal position of the roller with respect to horizontal is tangent to the top of the H-Seal as illustrated in FIG. 7. The seal is inserted in the gap 82 between the inner and the outer rings of the bearing. The bearing may provide a slewing bearing as shown.

A gap between the sliding pads can be optimized by further adjusting the position of the sliding pads to help an insertion zipper effect with a low friction. The sliding pads 18, 20 are configured move along grooves 53, 54 positioned in the male and female interconnecting assemblies 14, 16 respectively. In order to accomplish the sliding action, flat head countersunk (FHc) screws 52 are inserted through holes 55 disposed in the sliding pads 18, 20 and then through the grooves 53, 54 in the male and female interconnecting assemblies 14, 16 respectively. The screws are then screwed into a series of lock nuts 57 disposed on the inside of the male and female interconnection portions 14, 16, thus enabling accurate adjustment of the pads.

As such, the FHc screws may be loosened and to adjust the evolutive guides to slide forward with respect to the center of the insertion tool to adjust compression of the lower lips of the H-Seal. Alternately, the FHc screws may be loosened to adjust the evolutive guides backward away from the center of the insertion tool to adjust compression of the lower lips of the H-Seal.

Figure 8:
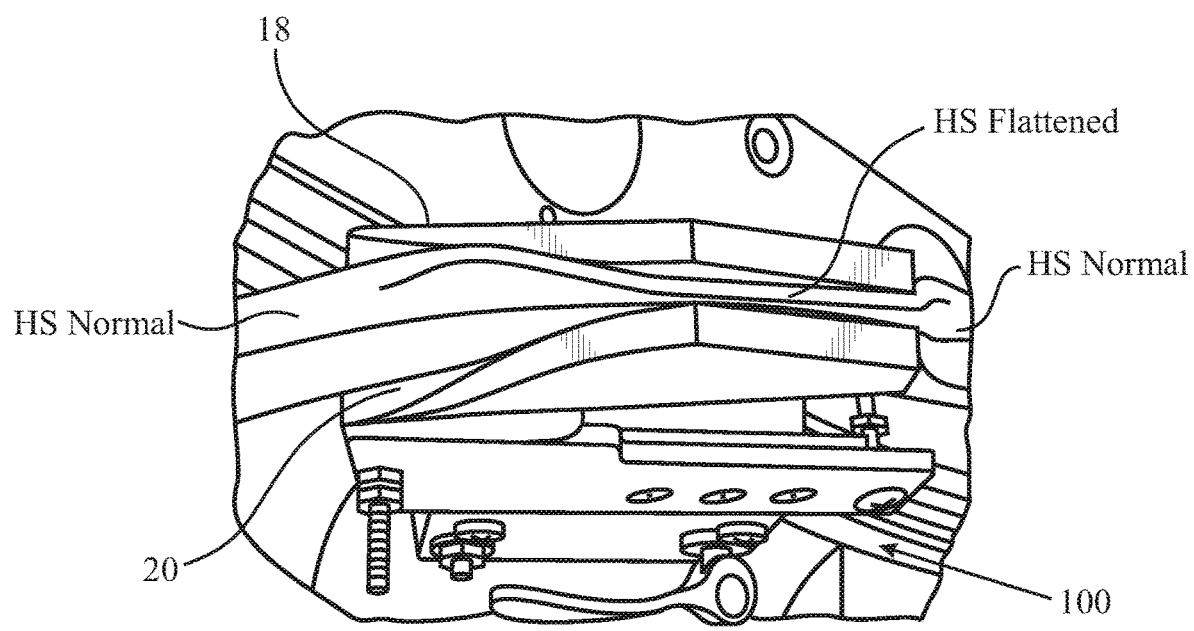
FIG. 8 shows an elevated perspective view of the insertion tool and H-Seal shown in an inverted position according to the present invention.

This allows the tool to be accurately adjusted when the seal is inserted in the slide channel of the bearing in order to keep the seal in an Y shape by forming the two lower lips close together. FIG. 8 shows the Y shape of the seal as the lips are compressed together (shown inverted). Once a correct fit is obtained between the tool, slot and seal, the screws are retightened and locked in place.

Detailed Description of the Method of Using the Mounting Tool

Figure 9:
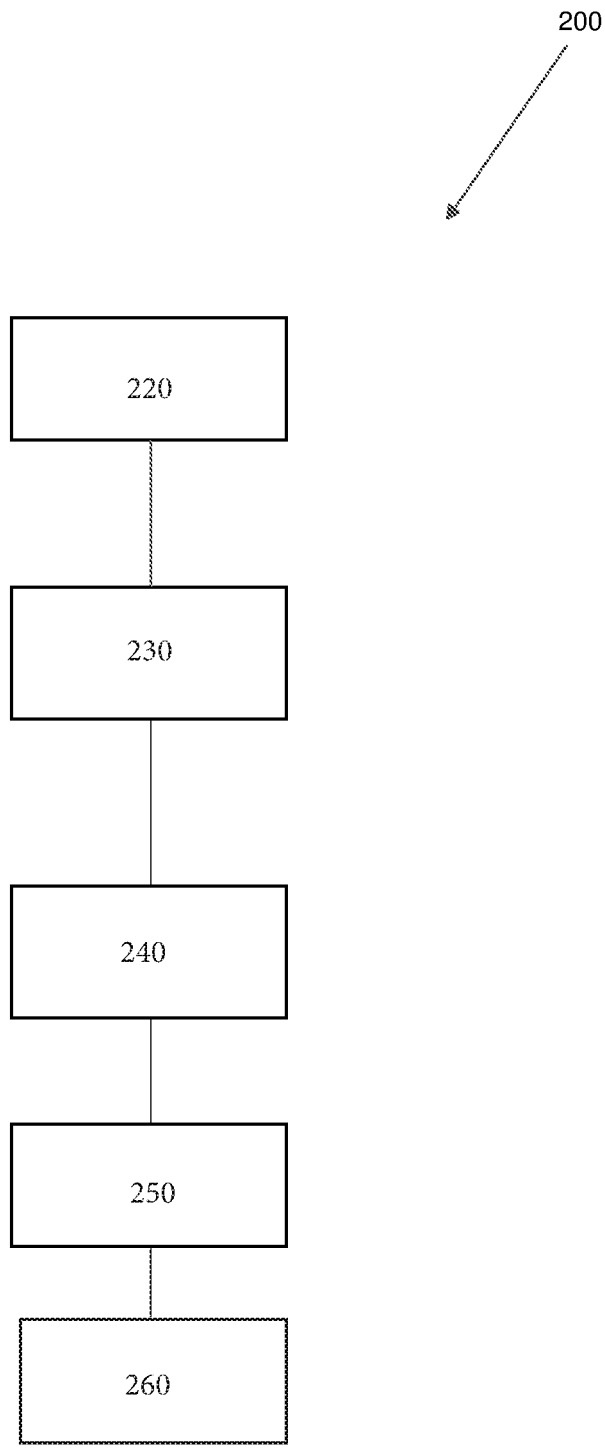
FIG. 9 shows a flow diagram of the steps required to install the H-Seal with the insertion tool.

A method 200 of inserting the H-Seal in a large diameter bearing as illustrated in the flow diagram of FIG. 9 will now be disclosed. See also FIGS. 2-3, 4-5, 6-8 and 10-14 that help illustrate the method steps.

The method shown in FIG. 9 includes a first step 220 of providing the tool 100 to install the H-Seal. As previously disclosed, the tool includes the sliding pads 18, 20 having the evolutive guides 21, 23 and also including the vertical part assembly 12.

FIGS. 2-3 show the exploded view of the tool assembly 100 having the sliding pads 18, 20 with the evolutive guides 21, 23 respectively disposed thereon. When the tool 100 is used to install the H-Seal, the first and second bearing contact surfaces 191, 192 glide and ride along top surfaces of the inner and outer 83, 85 bearing rings and along slot 193. Slot 193 is created by a depression in the two top surfaces of the inner and outer rings and the gap 82. FIG. 6 illustrates the configuration between the inner and outer rings.

Figure 10:
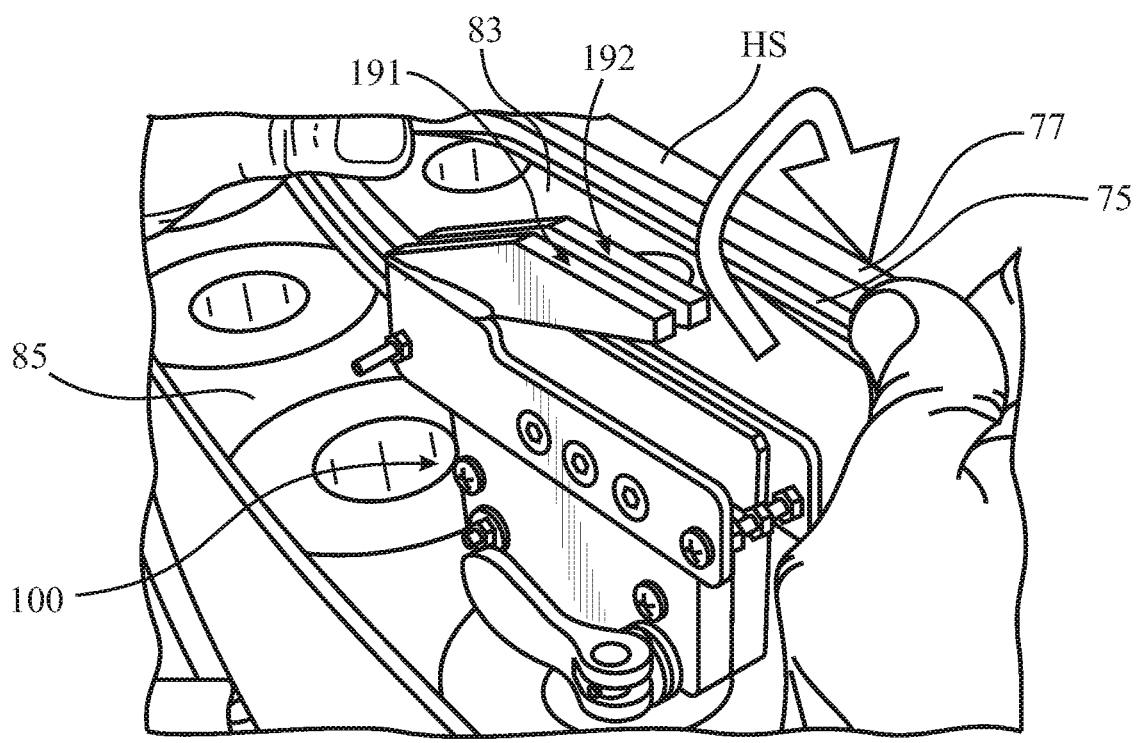
FIG. 10 shows an elevated perspective view of the tool assembly shown in an inverted position along with the H-Seal also shown in an inverted position positioned just above the tool.

The method further includes a step 230 of priming or initially inserting the H-Seal into the tool 100. FIG. 10 shows an elevated perspective view of the tool assembly 100 shown in an inverted position. The H-Seal is also shown in an inverted position. Here, the inverted H-Seal is positioned just above the tool 100. Therefore, the tool and H-Seal are both inverted so that the H-seal can easily be primed or initially inserted into the tool.

Figure 11:
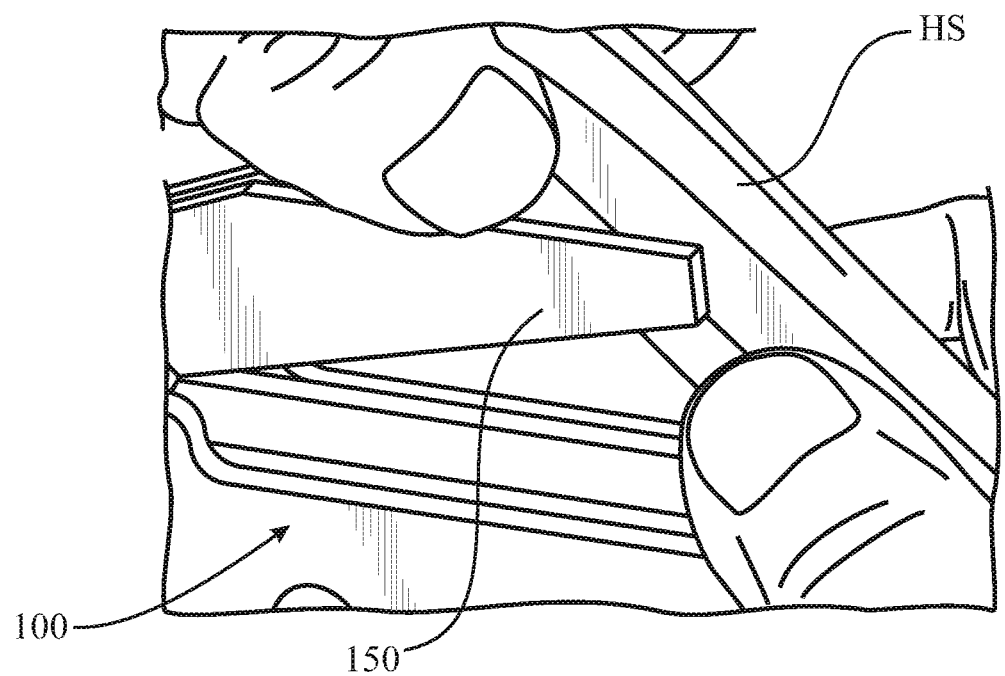
FIG. 11 shows a perspective view of the tool assembly shown in the inverted position with a top set of lips being manually folded together and starting to be inserted into the evolutive guides of the tool.

FIG. 11 shows a perspective view of the tool assembly still shown in the inverted position. Here the top set of lips 75 are manually folded together and slid in between the flattening blades 150 of the sliding pads. This is done by manually squeezing the top set of lips 75 at two arbitrary locations an inch or so apart and then pressed between the flattening blades and slid down into place. At this point, the H-Seal is just starting to be inserted into the tool.

Figure 12:
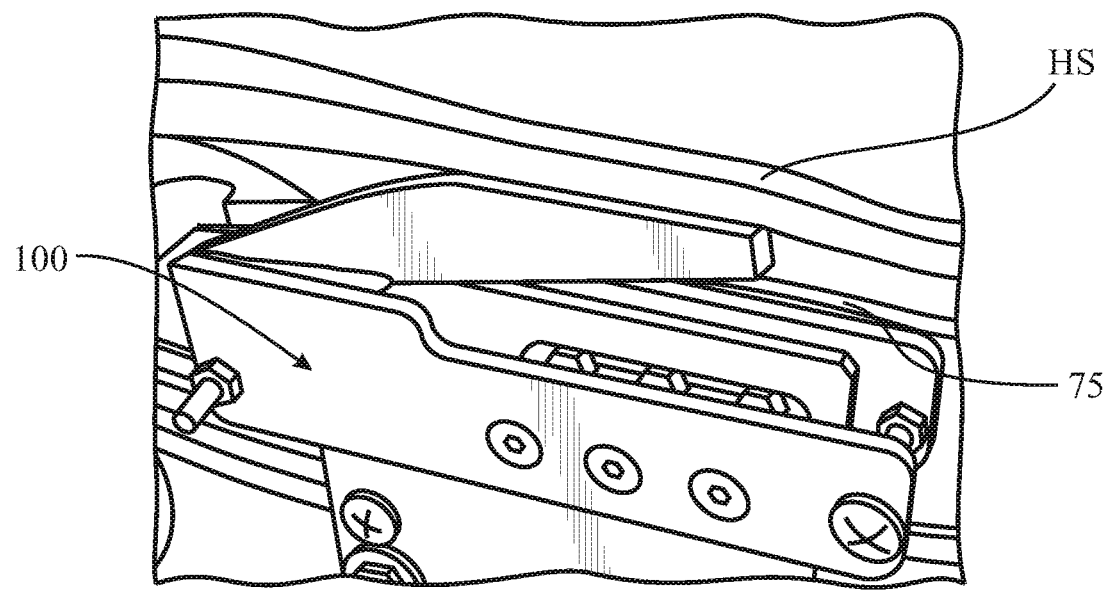
FIG. 12 shows an elevated perspective view of the tool assembly shown in an inverted position along with the top lips of the H-Seal being fully inserted into the tool.

FIG. 12 shows an elevated perspective view of the tool assembly still shown in an inverted position along with the H-Seal. During this step, the H-Seal is further inserted down between the flattening blades and evolutive guides of the tool. Here, the top lips of the H-Seal are fully inserted into the tool and are in their normal positioned opened outward.

FIG. 8 shows the H-Seal positioned within the tool assembly in a final preloaded phase (still shown inverted). Here, the top lips are still in their normal position opened outward, but the bottom lips are flattened. At this point, the H-Seal is now ready to be installed with the tool.

Figure 13:
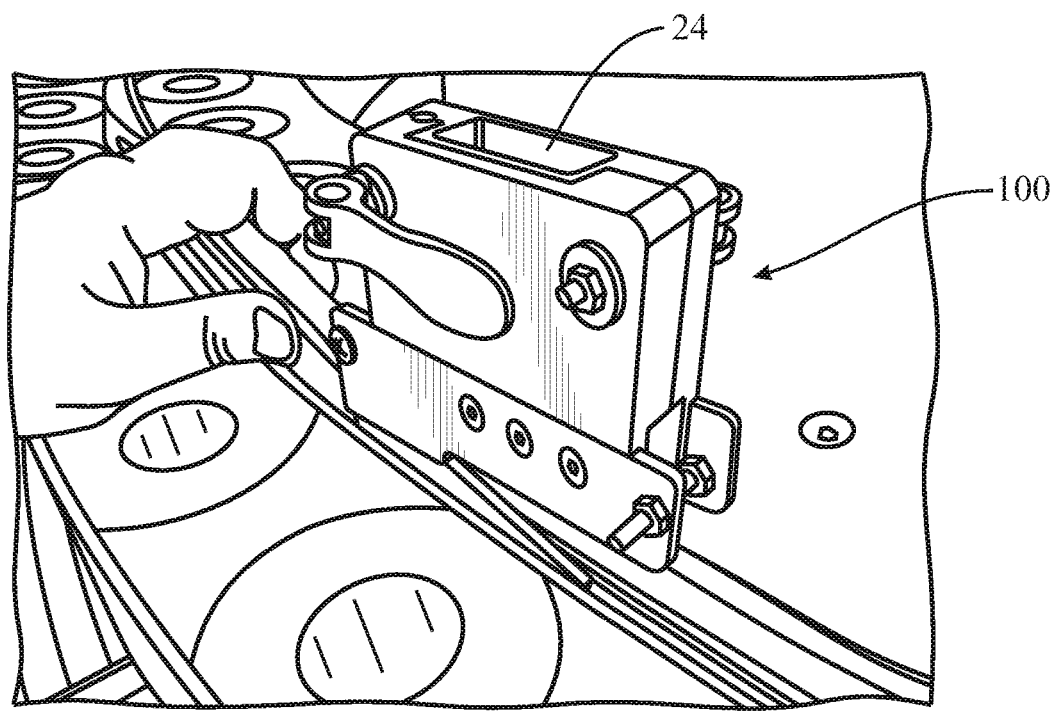
FIG. 13 shows an elevated perspective view of the tool assembly with the H-Seal initially inserted into the gap between the inner and outer rings of the bearing.

In step 240, with the H-Seal primed and both the tool and H-Seal being inverted into their normal orientation, the tool and Seal are loaded within the slot 193 and gap 82. Here, the sliding of the tool places the lower lips back on their respective open faces. FIG. 13 shows the tool assembly with the H-Seal initially inserted into the gap 82 between the inner and outer rings of the bearing. Notice, that the vertical part assembly 12 has not been installed into the slot 24 in the tool yet.

Figure 14:
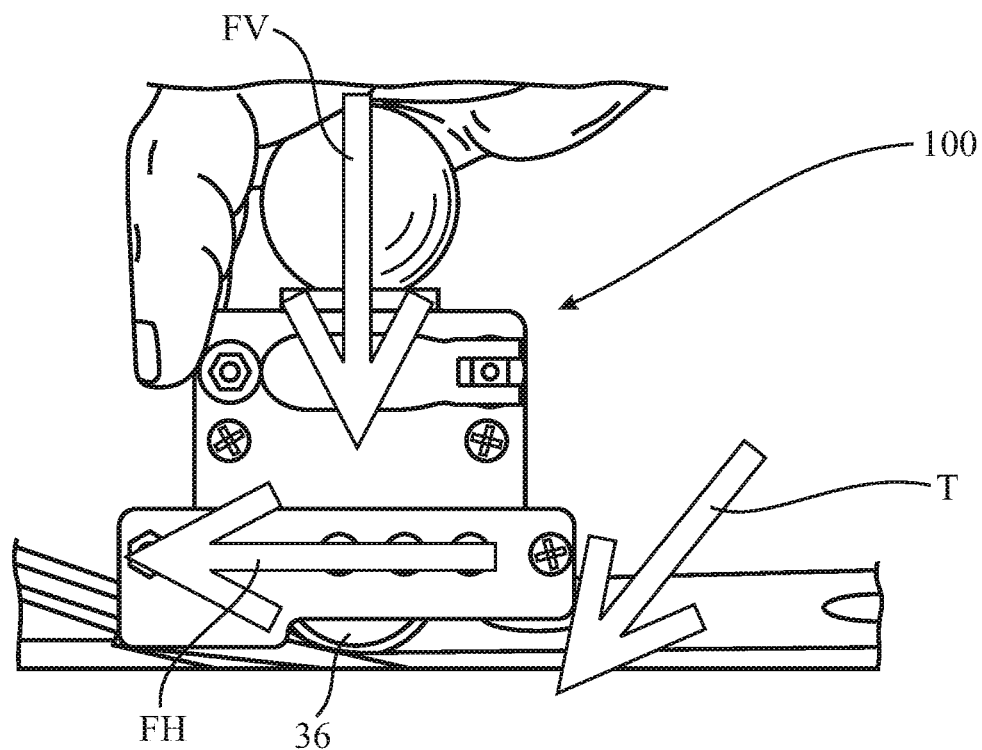
FIG. 14 shows a side view of the tool assembly including a vertical part assembly being inserted through the tool and showing the direction of forces required to act upon the tool and vertical part assembly in order to insert the H-Seal into the bearing.

FIG. 14 shows a side view of the tool assembly including the vertical part assembly being inserted through the tool and showing the direction of forces required to act upon the tool in order to install the H-Seal. Here, the vertical part assembly 12 is inserted into the tool.

As previously disclosed, during assembly, when the vertical part assembly 12 is inserted down through the slot 24, a close sliding fit is obtained between the top portion 11 of the vertical part assembly 12 and the slot 24 of the second interconnecting portion 16. The close sliding fit provides enough clearance for the accurate location of the top portion 11 into the slot 12 such that there is no noticeable play between the two.

When a vertical force VF is applied, the close sliding fit enables the freely rolling disc 36 to maintain a downward pressure on the top of the H-Seal. In addition, a force in the horizontal FH direction is required in order to move the tool and H-Seal. In this case, the force is shown moving the tool to the left. In reality, since the bearing is round, the horizontal force is actually directing the tool and Seal to move in a circular direction or clockwise.

Upon insertion of the H-Seal, an optimal position of the roller with respect to horizontal is tangent T to the top of the H-Seal as illustrated in FIG. 7. In addition, the tool and H-Seal may provide being installed in a counterclockwise direction. As such, the force to move the tool and seal assembly would be in turn be in a counterclockwise direction.

Step 250 provides ending the installation of the H-Seal with the tool. In step 250, the lower lips are allowed to recover their initial shape. As such, the tool moves the lower lips to a vertical position (T shape), inserts the seal between the 2 rings and the 2 lower lips recover their initial shape and places them naturally back on their respective faces.

As previously disclosed, the first and second evolutive guides 21, 23 are configured to pass the H-Seal between the stages of being in a free state with the lower lips opened outward, to being pre-inserted into the bearing, to being inserted into the bearing, to coming down into the bearing, to the lower lips opening downward in a vertical position (T-Shape) between the inner and outer bearing rings, and finally, the two lower lips being able to recover into their initial shape opened outward. Consequently, the H-Seal seals dirt or particulate from entering between the inner ring and the outer ring by sealing the surfaces between the top lips, bottom lips and vertical flange 79.

Figure 15:
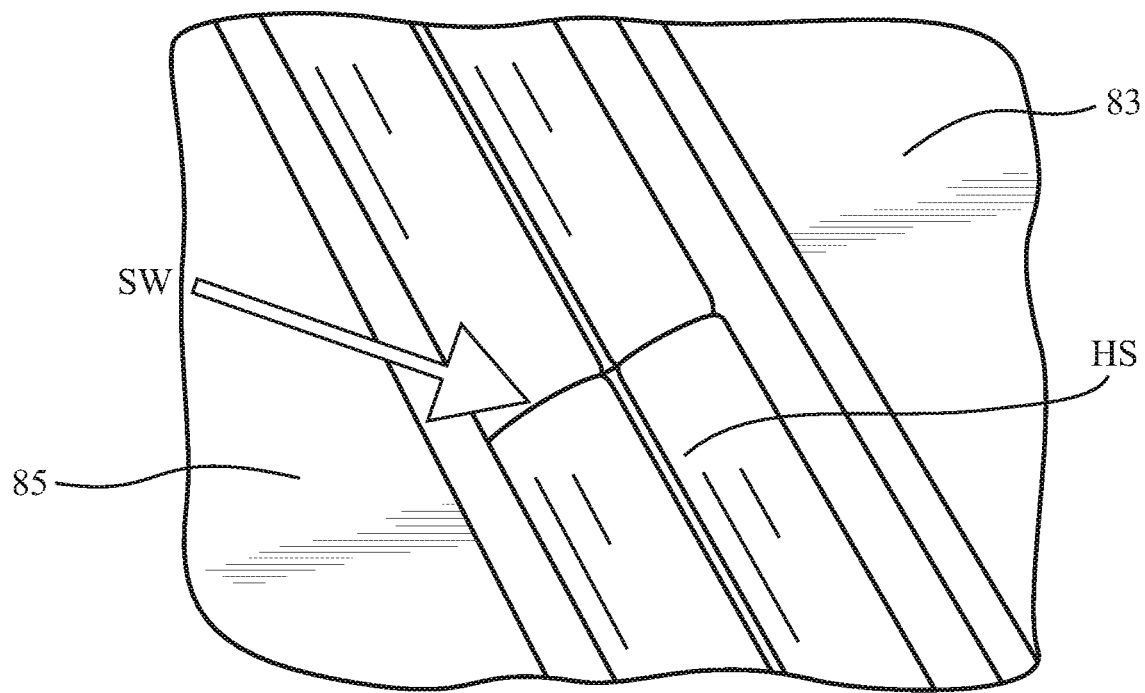
FIG. 15 shows an elevated perspective view of the H-Seal fully inserted into the bearing and being solvent welded together at the ends.

FIG. 15 shows an elevated perspective view of the H-Seal inserted into the bearing and being solvent welded together at the respective ends. In step 260, as shown, the two ends are placed and held together by way of solvent welding SW. However, it is well known there are numerous ways to bond two ends of a seal together and should not be limited to solvent welding.

Since many modifications, variations, and changes in detail can be made to the described preferred embodiments and methods of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. A method of inserting an H-Seal in a bearing, the H-Seal having two ends, two upper lips, two lower lips and a vertical flange positioned between the bearing that secures the upper and lower lips together, the bearing having seal faces, inner and outer rings and a gap therebetween, the method comprises the steps of:

providing an insertion tool having a first interconnecting portion configured to engage a second interconnecting portion, the insertion tool further comprising a roller which is vertically moveable relative to the first interconnecting portion, priming the H-Seal into the insertion tool, sliding the insertion tool with the H-Seal loaded therein within a slot, the slot being located within the insertion tool, placing the lower lips back in an initial position, allowing the lower lips to recover their initial shape, wherein the insertion tool moves the lower lips from the initial position to a vertical position so as to form a T-shape prior to insertion, inserts the seal between the rings and the lower lips return to the initial position.

2. The method of inserting an H-Seal in a bearing according to claim 1, further comprising first and second guides being configured to pass the H-Seal between the stages of being in a free state with the lower lips opened outward, to being pre-inserted into the bearing, to being inserted into the bearing, to coming down into the bearing, to the lower lips opening downward in the vertical position between the inner and outer bearing rings, and finally, the two lower lips being able to recover into the initial position.

3. The method of inserting an H-Seal in a bearing according to claim 1, wherein before the step of priming, the insertion tool and H-seal are inverted.

4. The method of inserting an H-Seal in a bearing according to claim 3, wherein before the step of sliding, the insertion tool and H-seal are inverted back to their position prior to installation into the bearing.

5. The method of inserting an H-Seal in a bearing according to claim 1, further comprising bonding the ends of the H-Seal being bonded together after the H-Seal is installed.

6. The method of inserting an H-Seal in a bearing according to claim 1, further comprising the first interconnecting portion configured to receive a vertical part assembly through an opening in the first interconnecting portion that compliments the shape top and bottom portions of the vertical part assembly.

7. The method of inserting an H-Seal in a bearing according to claim 6, further comprising during the step of sliding, a vertical downward force is applied to the vertical part assembly.

8. The method of inserting an H-Seal in a bearing according to claim 2, further comprising during the step of sliding, a horizontal force is applied to the insertion tool in order set the tool in motion to install the H-Seal.

9. The method of inserting an H-Seal in a bearing according to claim 6, further comprising during the step of sliding, a position of the roller with respect to horizontal is tangent to the top of the H-Seal.

10. A method of inserting an H-Seal in a bearing, the H-Seal having two ends, two upper lips, two lower lips and a vertical flange positioned between the bearing that secures the upper and lower lips together, the bearing having seal faces, inner and outer rings and a gap therebetween, the method comprises the steps of:

providing an insertion tool having a first interconnecting portion configured to engage a second interconnecting portion, using at least one cam lever to adjust a width of the insertion tool to match a width of the H-Seal, priming the H-Seal into the insertion tool, sliding the insertion tool with the H-Seal loaded therein within a slot, the slot being located within the insertion tool, placing the lower lips back on their respective face, allowing the lower lips to recover their initial shape, wherein the insertion tool moves the lower lips from an initial position to a vertical position so as to form a T-shape prior to insertion, inserts the seal between the rings and the lower lips return to the initial position.

11. The method of inserting an H-Seal in a bearing according to claim 10, further comprising first and second guides being configured to pass the H-Seal between the stages of being in a free state with the lower lips opened outward, to being pre-inserted into the bearing, to being inserted into the bearing, to coming down into the bearing, to the lower lips opening downward in the vertical position between the inner and outer bearing rings, and finally, the two lower lips being able to recover into the initial position.

12. The method of inserting an H-Seal in a bearing according to claim 10, wherein before the step of priming, the insertion tool and H-seal are inverted.

13. The method of inserting an H-Seal in a bearing according to claim 12, wherein before the step of sliding, the insertion tool and H-seal are inverted back to their position prior to installation into the bearing.

14. The method of inserting an H-Seal in a bearing according to claim 10, further comprising bonding the ends of the H-Seal being bonded together after the H-Seal is installed.

15. The method of inserting an H-Seal in a bearing according to claim 10, further comprising the first interconnecting portion configured to receive a vertical part assembly through an opening in the first interconnecting portion that compliments the shape top and bottom portions of the vertical part assembly.

16. The method of inserting an H-Seal in a bearing according to claim 15, further comprising during the step of sliding, a vertical downward force is applied to the vertical part assembly.

17. The method of inserting an H-Seal in a bearing according to claim 11, further comprising during the step of sliding, a horizontal force is applied to the insertion tool in order set the tool in motion to install the H-Seal.

18. The method of inserting an H-Seal in a bearing according to claim 6, further comprising during the step of sliding, a position of a roller of the insertion tool with respect to horizontal is tangent to the top of the H-Seal.

* * * * *